US011275362B2

(12) United States Patent
Ghosh et al.

(10) Patent No.: US 11,275,362 B2
(45) Date of Patent: Mar. 15, 2022

(54) TEST TIME REDUCTION FOR MANUFACTURING PROCESSES BY SUBSTITUTING A TEST PARAMETER

(71) Applicant: Robert Bosch GmbH, Stuttgart (DE)

(72) Inventors: Rumi Ghosh, Palo Alto, CA (US); Soundararajan Srinivasan, Cambridge, MA (US); Ruobing Chen, Mountain View, CA (US); Shan Kang, Mountain View, CA (US); Marc Naumann, Sunnyvale, CA (US); Mahesh Goud Tandarpally, Los Angeles, CA (US)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 16/433,461

(22) Filed: Jun. 6, 2019

(65) Prior Publication Data
US 2020/0387148 A1     Dec. 10, 2020

(51) Int. Cl.
*G05B 19/418*     (2006.01)
*G06N 20/10*     (2019.01)
(Continued)

(52) U.S. Cl.
CPC .... *G05B 19/41885* (2013.01); *G06F 11/3428* (2013.01); *G06F 17/18* (2013.01);
(Continued)

(58) Field of Classification Search
CPC .......... G05B 19/41885; G06K 9/6267; G06K 9/6256; G06F 17/18; G06F 11/3428; G06N 20/10
See application file for complete search history.

(56) References Cited

U.S. PATENT DOCUMENTS 5,284,164 A    2/1994 Andrews et al.
6,367,041 B1    4/2002 Statovici et al.
(Continued)

OTHER PUBLICATIONS

Grabau et al., "Using a Simulation to Generate The Data to Balance an Assembly Line", Proceedings of the 1997 Winter Simulation Conference, 1997, pp. 733-738.
(Continued)

*Primary Examiner* — Ziaul Karim
(74) *Attorney, Agent, or Firm* — Michael Best & Frieddrich LLP

(57) ABSTRACT

Methods and systems of identifying a time reduction in a manufacturing time associated with a plurality of products. One system includes an electronic processor configured to receive training data. The electronic processor is also configured to determine a first set of testing parameters from the plurality of testing parameters to remove for the assembly line based on the training data and determine a second set of testing parameters to keep by removing the first set of testing parameters from the plurality of testing parameters. The electronic processor is also configured to determine a predictive model to replace the first set of testing parameters based on the training data associated with the second set of testing parameters, and automatically update a testing process for the assembly line to turn off the first set of testing parameters and use the predictive model in place of the first set of testing parameters.

20 Claims, 17 Drawing Sheets
(2 of 17 Drawing Sheet(s) Filed in Color)

(51) Int. Cl.
*G06F 17/18* (2006.01)
*G06K 9/62* (2006.01)
*G06F 11/34* (2006.01)

(52) U.S. Cl.
CPC ......... *G06K 9/6256* (2013.01); *G06K 9/6267* (2013.01); *G06N 20/10* (2019.01)

(56) References Cited

U.S. PATENT DOCUMENTS

| | | | |
|---|---|---|---|
| 6,480,794 | B1 | 11/2002 | Hsieh et al. |
| 6,594,599 | B1 | 7/2003 | Kent et al. |
| 7,596,731 | B1 | 9/2009 | Sharma |
| 7,682,842 | B2 | 3/2010 | Desineni et al. |
| 7,930,130 | B2 | 4/2011 | Sakarovitch et al. |
| 8,370,181 | B2 | 2/2013 | Shah-Hosseini |
| 8,855,959 | B2 | 10/2014 | Johnson et al. |
| 2004/0148549 | A1 | 7/2004 | Voorakaranam et al. |
| 2005/0228511 | A1* | 10/2005 | Das .................. G05B 13/0265 700/28 |
| 2007/0220034 | A1* | 9/2007 | Iyer .................... G06F 16/2465 |
| 2009/0228408 | A1* | 9/2009 | Kaushal ................ G06N 20/00 706/12 |
| 2009/0299679 | A1 | 12/2009 | Desineni et al. |
| 2011/0131162 | A1* | 6/2011 | Kaushal ................ G06N 20/00 706/13 |
| 2015/0262095 | A1 | 9/2015 | Rajasekaran et al. |
| 2015/0304772 | A1* | 10/2015 | Risberg ................ H04R 3/007 381/55 |
| 2016/0196587 | A1 | 7/2016 | Eder |
| 2017/0206127 | A1 | 7/2017 | Thompson et al. |
| 2017/0206468 | A1* | 7/2017 | Ghosh ................ G05B 13/0265 |
| 2017/0206469 | A1 | 7/2017 | Das et al. |
| 2018/0300865 | A1 | 10/2018 | Weiss et al. |
| 2019/0089720 | A1 | 3/2019 | Aditham et al. |
| 2019/0171187 | A1 | 6/2019 | Cella et al. |
| 2019/0174207 | A1 | 6/2019 | Cella et al. |
| 2019/0339688 | A1* | 11/2019 | Cella ................ G05B 19/41865 |
| 2020/0174495 | A1 | 6/2020 | Mallik et al. |
| 2020/0278972 | A1 | 9/2020 | Zhou et al. |

OTHER PUBLICATIONS

Tao et al., "Data-driven smart manufacturing", Journal of Manufacturing Systems, vol. 48, 2018, pp. 157-169.

United States Patent Office Non final Rejection for U.S. Appl. No. 16/433,446 dated Oct. 5, 2020 (16 pages).

Village et al., "Using action research to develop human factors approaches to improve assembly quality during early design and ramp-up of an assembly line", International Journal of Industrial Ergonomics, vol. 61, 2017, pp. 107-119.

Michalos et al., "Automotive assembly technologies review: challenges and outlook for a flexible and adaptive approach", CIRP Journal of Manufacturing Science and Technology, vol. 2, 2010, pp. 81-91.

Lefever et al., "Design for Assembly Techniques in Reverse Engineering and Redesign", ASME Design Theory and Methodology Conference, 1996, pp. 1-28.

* cited by examiner

Data Upload

Step 1/10

Data Format Information: Please upload your data in the following format:

- CSV File
- Rows are separated parts
- Columns represent information about parts, e.g. test measurements, results, serial no. data, etc.
- Customers must be separated by commas (,)
- Column names and values must not contain commas (,)

Sample Data

| Date and Time | Serial Number | State | Test Measurement 1 | Test Measurement 2 | Test Measurement 3 |
|---|---|---|---|---|---|
| 6/19/2013 14:55 | 106493461 | CO | 129 | 127 | 0249 |
| --- | --- | --- | --- | --- | --- |
| --- | --- | --- | --- | --- | --- |

Upload the data file (*.csv file):

[Dated autosave] [Keep autogenerate]

Optional: if you know the schemes of the data, if available, please upload it. Else, skip scheme upload.

[Dated autosave] [Keep autogenerate]

[Previous Step] [Next Step]

*FIG. 4*

Data Understanding

Step 6/10

Please help us to understand your data better.

Are there any predefined groups of test measurements?

According to your knowledge, do you want to restrict some of the test measurements to be removed only together. If so, they would belong to one group.

For example, a number of measurements which are all highly related to the same test process that is used to collect them.

Are there any such predefined groups of two or more test measurements?

Yes | No

Actual Data

| Index | Description | Sample Value |
|---|---|---|
| 1 |  | 0 |
| 2 | Result | 10 |
| 3 | "Travel sens. neutral XX (prop)MIN 115MAX 141Digits" | 132 |
| 4 | "Travel sens. neutral YY (full)MIN 121MAX 135Digits" | 125 |

Previous Step

Confirmation

You are almost there!

Confirm your data:

- The test measurement and results you have entered are highlighted
- Please check if the "type" (test measurement / not specified / result) of each row makes sense.
- Please check if any group information is correct.

| Description | Type ▼ | Time ▼ | Group Info ▼ |
|---|---|---|---|
| | Not Specified | NotAcceptable | NotAcceptable |
| Result | | | |
| ""Travel sens. neutral XX (prop)MIN 115MAX 141Digits""" | Result | 4.0735 | NotAcceptable |
| ""Travel sens. neutral YY (full)MIN 121MAX 135Digits""" | Test Measurements | 4.0735 | 1 |
| ""Float position full range MIN 31MAX 51Digits""" | Test Measurements | 2.2745 | 1 |
| ""Float position change MIN 81MAX 93Digits""" | Test Measurements | 2.2745 | 2 |
| ""Leakage4 B-RMIN 0MAX 2ml/min""" | Test Measurements | 9.386 | 2 |
| ""League4 A-RMIN 2MAX 48ml/min""" | Test Measurements | 9.386 | 3 |

Click "Confirm" to start the test time reduction analysis.

[ Next Step ]

Step 10/10

*FIG. 7*

Results

Correlations

Example needed? | Example |

1) These five measurements have the highest correlation with the test results (0-100%):

| Measurement | Value of correlation [%] |
|---|---|
| Amplitude 1 MIN 3 MAX 8 Digits | 31.6 |
| Leakage4 1 MIN 1 MAX 1 ml/min | 26 |
| Leakage 3 MIN 3 MAX 29 ml/min | 23 |
| Extend leakage 1 MIN 36 MAX 279 ml/min | 20.9 |
| Extend leakage 2 MIN 58 MAX 758 ml/min | 20.8 |

*FIG. 11*

TEST TIME REDUCTION FOR MANUFACTURING PROCESSES BY SUBSTITUTING A TEST PARAMETER

FIELD

Embodiments described herein relate to using data mining methods and big data analytics techniques to reduce manufacturing time of a product.

SUMMARY

Reducing the manufacturing time associated with a product may increase the revenue gain for the product. Accordingly, embodiments described herein provide apparatuses, computer readable mediums, and methods that use data mining methods to reduce manufacturing time. Some embodiments described herein reduce manufacturing time by reducing the time associated with assembling, transporting, finishing, or otherwise manufacturing a product, such as a product manufactured using an assembly or production line. Alternatively or in addition, some embodiments described herein may reduce manufacturing time by reducing the time associated with testing a manufactured product, such as a product manufactured using an assembly or production line. As described in more detail below, data mining may be used to reduce manufacturing time by, for example, (a) removing redundant measurements or values or tests, (b) performing data cleaning and preprocessing, (c) removing highly-correlated measurements, values, tests, or stations, (d) performing brute force feature explorations and combinations, (e) substituting measurements, values, tests, or stations with data mining or machine learning models, (f) predicting a "good" or a "bad" product using a set of measurements, tests, or stations and eliminating other measurements, tests, or stations, or by a combination thereof.

For example, one embodiment provides a system of identifying a time reduction in a manufacturing time associated with a plurality of products produced via an assembly line. The system includes an electronic processor. The electronic processor is configured to receive a dataset associated with the assembly line. The dataset includes a classification for each of the plurality of products produced by the assembly line, where the assembly line is associated with a plurality of tests. The electronic processor is also configured to determine a set of test combinations for the assembly line based on the plurality of tests. For each test combination included in the set of test combinations, the electronic processor is configured to determine a number of missing products based on the classification for each of the plurality of products. The electronic processor is also configured to determine at least one test included in the plurality of tests to remove based on the number of missing products for each test combination included in the set of test combinations and output a result including an indication of the at least one test included in the plurality of tests to remove.

Another embodiment provides a method of identifying a time reduction in a manufacturing time associated with a plurality of products produced via an assembly line. The method includes receiving, with an electronic processor, a dataset associated with the assembly line. The dataset includes a classification for each of the plurality of products produced by the assembly line, where the assembly line is associated with a plurality of tests. The method also includes determining, with the electronic processor, a set of test combinations for the assembly line based on the plurality of tests. The method also includes, for each test combination included in the set of test combinations, determining, with the electronic processor, a number of missing products based on the classification for each of the plurality of products. The method also includes determining, with the electronic processor, at least one test included in the plurality of tests to remove based on the number of missing products for each test combination included in the set of test combinations and outputting a result including an indication of the at least one test included in the plurality of tests to remove.

Another embodiment provides a non-transitory computer readable medium including instructions that, when executed by an electronic processor, causes the electronic processor to execute a set of functions. The set of functions includes receiving a dataset associated with an assembly line. The dataset includes a classification for each of a plurality of products produced by the assembly line, where the assembly line is associated with a plurality of tests. The set of functions also includes determining a set of test combinations for the assembly line based on the plurality of tests. The set of functions also includes, for each test combination included in the set of test combinations, determining a number of missing products based on the classification for each of the plurality of products. The set of functions also includes determining at least one test included in the plurality of tests to remove based on the number of missing products for each test combination included in the set of test combinations and outputting a result including an indication of the at least one test included in the plurality of tests to remove.

Another embodiment provides a system of identifying a time reduction in a manufacturing time associated with a plurality of products produced via an assembly line. The system includes an electronic processor. The electronic processor is configured to receive training data associated with a plurality of testing parameters for the assembly line. The electronic processor is also configured to determine a first set of testing parameters from the plurality of testing parameters to remove for the assembly line based on the training data. The electronic processor is also configured to determine a second set of testing parameters to keep by removing the first set of testing parameters from the plurality of testing parameters. The electronic processor is also configured to determine a predictive model to replace the first set of testing parameters based on the training data associated with the second set of testing parameters, and automatically update a testing process for the assembly line to turn off the first set of testing parameters and use the predictive model in place of the first set of testing parameters.

Another embodiment provides a method of identifying a time reduction in manufacturing time of a plurality of products associated with an assembly line. The method includes receiving, with an electronic processor, training data associated with a plurality of testing parameters for the assembly line. The method also includes determining, with the electronic processor, a first set of testing parameters to remove for the assembly line based on the training data. The method also includes determining, with the electronic processor, a second set of testing parameters to keep by removing the first set of testing parameters from the plurality of testing parameters. The method also includes determining, with the electronic processor, a predictive model to replace the first set of testing parameters based on the training data associated with the second set of testing parameters and automatically updating a testing process for the assembly line to turn off the first set of testing parameters and use the predictive model in place of the first set of testing parameters.

Another embodiment provides a non-transitory computer readable medium including instructions that, when executed by an electronic processor, causes the electronic processor to execute a set of functions. The set of functions includes receiving training data associated with a plurality of testing parameters for the assembly line. The set of functions also includes determining a first set of testing parameters to remove for the assembly line based on the training data and determining a second set of testing parameters to keep by removing the first set of testing parameters from the plurality of testing parameters. The set of functions also includes determining a predictive model to replace the first set of testing parameters based on the training data associated with the second set of testing parameters and automatically updating a testing process for the assembly line to turn off the first set of testing parameters and use the predictive model in place of the first set of testing parameters.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 4 is a user interface provided through the system of FIG. 2 for uploading a file according to some embodiments.

FIGS. 5 and 6 are user interfaces provided through the system of FIG. 2 for inputting configuration parameters according to some embodiments.

FIG. 7 is a user interface provided through the system of FIG. 2 for confirming inputted data according to some embodiments.

FIGS. 11 and 12 illustrate sample results of a correlation analysis according to some embodiments.

DETAILED DESCRIPTION

Figure 1:
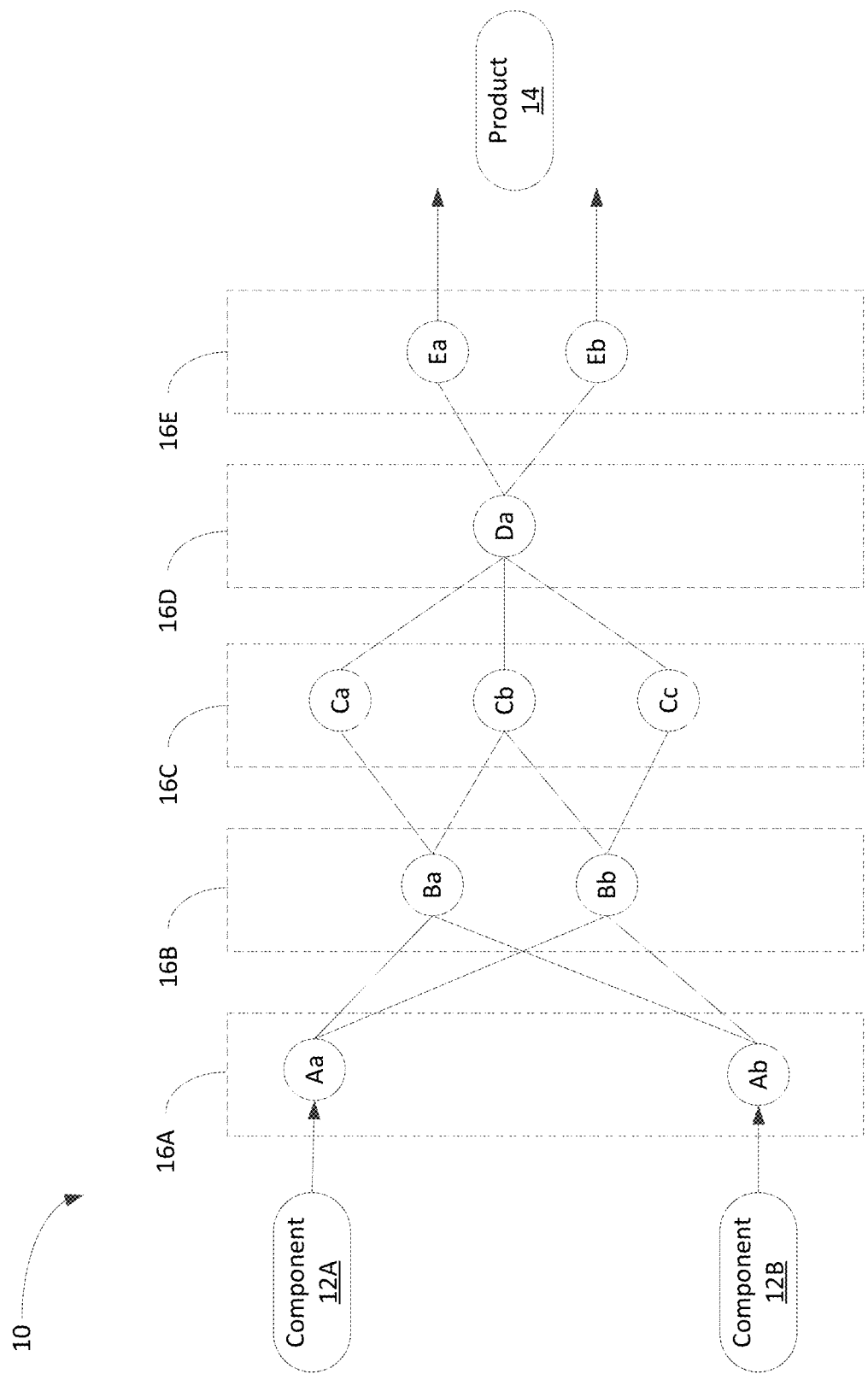
FIG. 1 schematically illustrates an assembly line producing a product according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory, computer readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, embodiments described herein relate to using data mining to reduce product manufacturing time. This time reduction may include the reduction of time to manufacture a product in an assembly or production line or the reduction of test time. Also, in some embodiments, this time reduction may include the reduction of materials, personnel, engineering, or other investments associated with manufacturing a product. Accordingly, as used in the present application, "reducing manufacturing time" may include reducing a time to manufacture a product, a time to test a product, inputs or other investments associated with the product, or a combination thereof. Also, as used in the present application, a product produced by an assembly line may include a component used within the assembly line, a composite product generated by the assembly line (as a combination of one or more components), a final product output by the assembly line, or a combination thereof.

FIG. 1 schematically illustrates an assembly line 10. It should be understood that the assembly line 10 illustrated in FIG. 1 is provided as one example of an assembly line, and the embodiments described herein may be used with any type of assembly line (for example, an assembly line for automotive parts, automobiles, aircrafts, heavy equipment, and the like) and are not limited to the example assembly line 10 illustrated in FIG. 1.

As illustrated in FIG. 1, the assembly line 10 receives a first component 12A and a second component 12B as input and produces a product 14 (for example, at an end of the assembly line 10). The assembly line 10 also includes a plurality of stations that are used to convert the first component 12A and the second component 12B into the product 14. For example, as illustrated in FIG. 1, the assembly line 10 includes five stages of production (for example, five stations along the assembly line 10) of the product 14 and each stage includes one or more stations. A first stage 16A (a supply stage) includes a plurality of first stations Aa and Ab. A second stage 16B (an attachment stage) includes a plurality of second stations Ba and Bb. A third stage 16C (a collection stage) includes a plurality of third stations Ca, Cb, and Cc. A fourth stage 16D (a finishing stage) includes a fourth station Da. A fifth stage 16E (a testing stage) includes a plurality of fifth stations Ea and Eb. The fifth stations Ea and Eb perform an end-of-line test. For example, each station Ea and Eb may test a product 14 by taking one or more measurements or values (attributes) of the product 14 (for example, size, shape, color, temperature, position, and the like). The attributes may be used to determine whether the product 14 passes or fails one or more approval metrics. When the attributes do not satisfy the approval metrics, the product 14 fails the metrics and the product 14 may be classified as "bad" or "scrap." Conversely, when the attributes satisfy the approval metrics, the product 14 passes the metrics and may be classified as "good." In some embodiments, the measurements may be collected by other stations included in the assembly line 10 and, in some embodiments, the assembly line 10 includes multiple testing stages and associated stations and the end-of-line test may take into account one or more attributes collected by other stations, test results from other testing stations, or a combination thereof.

Data regarding the assembly line 10 and performance of the assembly line 10 may be tracked and stored in various data storage devices. For example, in some embodiments, data regarding the assembly line 10, performance of the assembly line 10 (station parameters or performance), inputs and outputs to the assembly line 10, product attributes, test results, and classifications, and the like are stored in a manufacturing execution system (MES) database, a log data database, one or more text files, or a combination thereof. In some embodiments, the data stored in such data storage devices is collected by one or more sensors that collect measurements, test data (for example, whether a product passes or fails a particular test), or both associated with the assembly line 10. For example, one or more sensors may be associated (for example, positioned near) one or more stations included in the assembly line 10. For example, using the example assembly line 10 illustrated in FIG. 1, at least one sensor may be associated with each of the plurality of stations included in the assembly line 10. The sensors may collect raw data pertaining to a product 14 or components included in a product 14 (for example, components 12A and 12B) manufactured by the assembly line 10. In particular, in some embodiments, the raw data collected by the sensors include data pertaining to a product 14 as it passes through the assembly line 10, such as a measurement, value, or a test result (for example, whether the product passes or fails one or more approval metrics for the assembly line 10). The sensors may include an image sensor (for example, a camera), a barcode reader, a radio frequency receiver, a temperature sensor, a proximity sensor, a measurement sensor, and the like. In addition to or as an alternative to collecting data via one or more sensors, similar data may also be collected manually, which may be manually input to a data storage device by a user.

Figure 2:
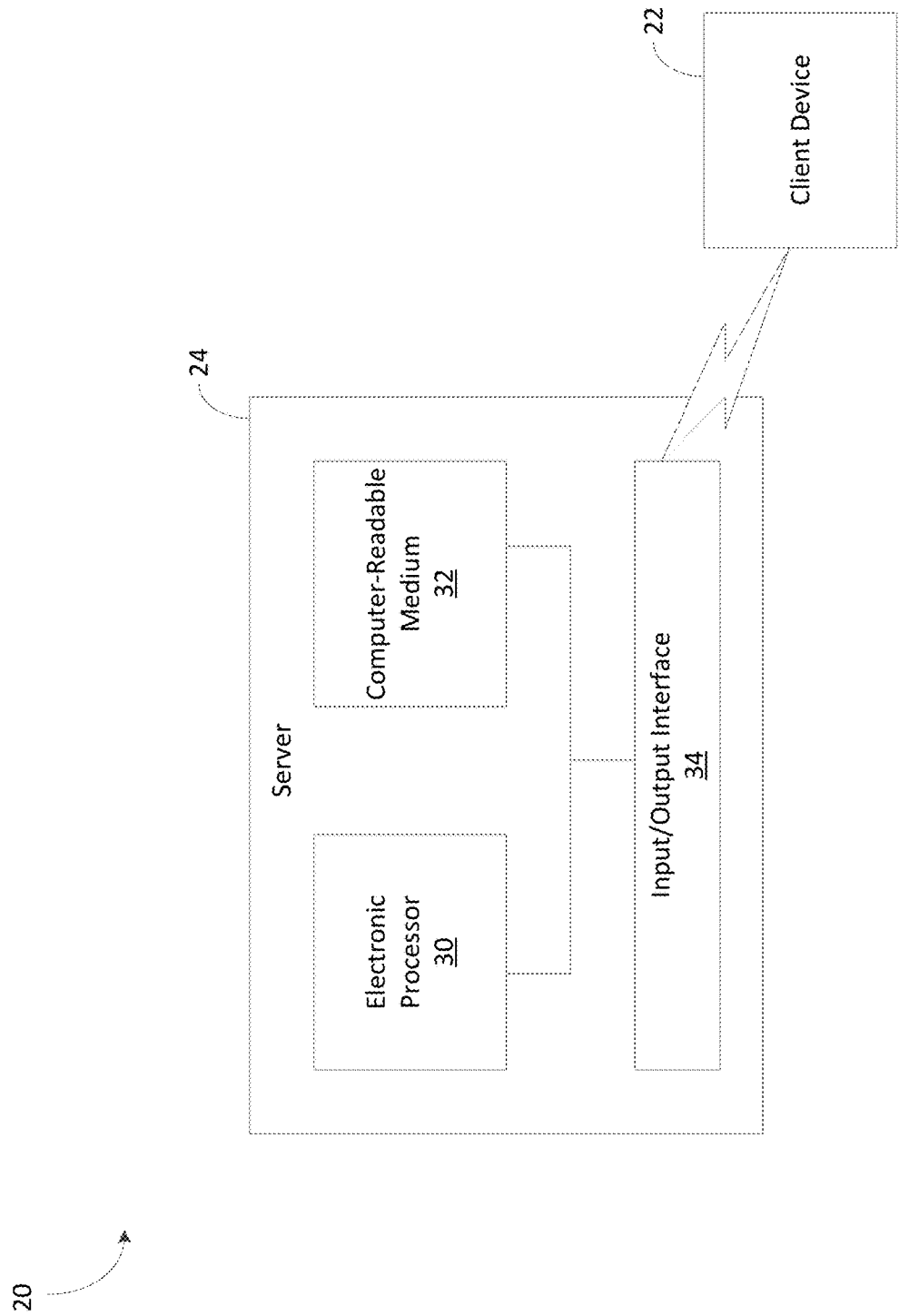
FIG. 2 schematically illustrates a system for reducing manufacturing time associated with the assembly line of FIG. 1 according to some embodiments.

As illustrated in FIG. 2, data collected regarding the assembly line 10 may be processed using a system 20 to reduce a manufacturing time associated with the assembly line 10. As illustrated in FIG. 2, the system 20 includes a client device 22 and a server 24. It should be understood that although a client-server configuration of the system 20 is illustrated in FIG. 2, the system 20 may alternatively be implemented where the client device 22 performs local processing without communicating with an external device, such as a server. Also, it should be understood that the functionality performed by the server 24 as described herein may be distributed among multiple servers or portions thereof may be performed by the client device 22. For example, in some embodiments, the server 24 may include a web server that communicates with the client device 22 and the server 24 may communicate with a separate analytics server to perform the methods described herein.

The client device 22 communicates with the server 24 over a wired connection, a wireless connection, or a combination thereof. For example, in some embodiments, the client device 22 communicates with the server 24 over a wireless communication network, such as the Internet, a mesh network, a cellular network, a private network, a public network, or a combination thereof. Also, in some embodiments, one or more intermediary devices (not shown) may manage communication between the client device 22 and the server 24. In some embodiments, the client device 22 executes a browser application to communicate with the server 24 and, in particular, to access user interfaces provided by the server 24. In other embodiments, the client device 22 executes a dedicated client application to communicate with the server 24.

As illustrated in FIG. 2, the server 24 may include an electronic processor 30 (for example, a microprocessor or another suitable programmable device), a computer-readable medium 32 (for example, one or more non-transitory computer-readable storage mediums), and an input/output interface 34. The electronic processor 30, the computer-readable medium 32, and the input/output interface 34 communicate over one or more control or data connections or buses. It should be understood that the server 24 illustrated in FIG. 2 represents one example of a server 24 and embodiments described herein may include servers with additional, fewer, or different components than the server 24 illustrated in FIG. 2. Also, in some embodiments, the server 24 performs functionality in addition to the functionality described herein. It should be understood that the client device 22 may include similar electronic components as the server 24 (with the addition of one or more input devices, output devices, or a combination thereof for interfacing with a user of the client device 22) although not illustrated or described in the present application.

The computer-readable medium 32 of the server 24 may include a program storage area and a data storage area. The program storage area and the data storage area may include read-only memory (ROM), random access memory (RAM) (for example, dynamic RAM (DRAM), synchronous DRAM (SDRAM), and the like), electrically erasable programmable read-only memory (EEPROM), flash memory, a hard disk, a secure digital (SD) card, other suitable memory devices, or a combination thereof. The electronic processor 30 executes computer-readable instructions (software) stored in the computer-readable medium 32. The software may include firmware, one or more applications, program data, filters, rules, one or more program modules, and other executable instructions.

In particular, the server 24 (the electronic processor 30) executes instructions (for example, stored in the computer-readable medium 32) to identify reductions in the manufacturing time associated with an assembly line, such as by executing instructions to perform the methods described herein. Although the method described below may include multiple sub-methods, each such sub-method may be performed as a stand-alone process. Thus, the server 24 may be configured to perform one or a combination of the sub-methods described below to reduce manufacturing time associated with a particular assembly line.

Figure 3:
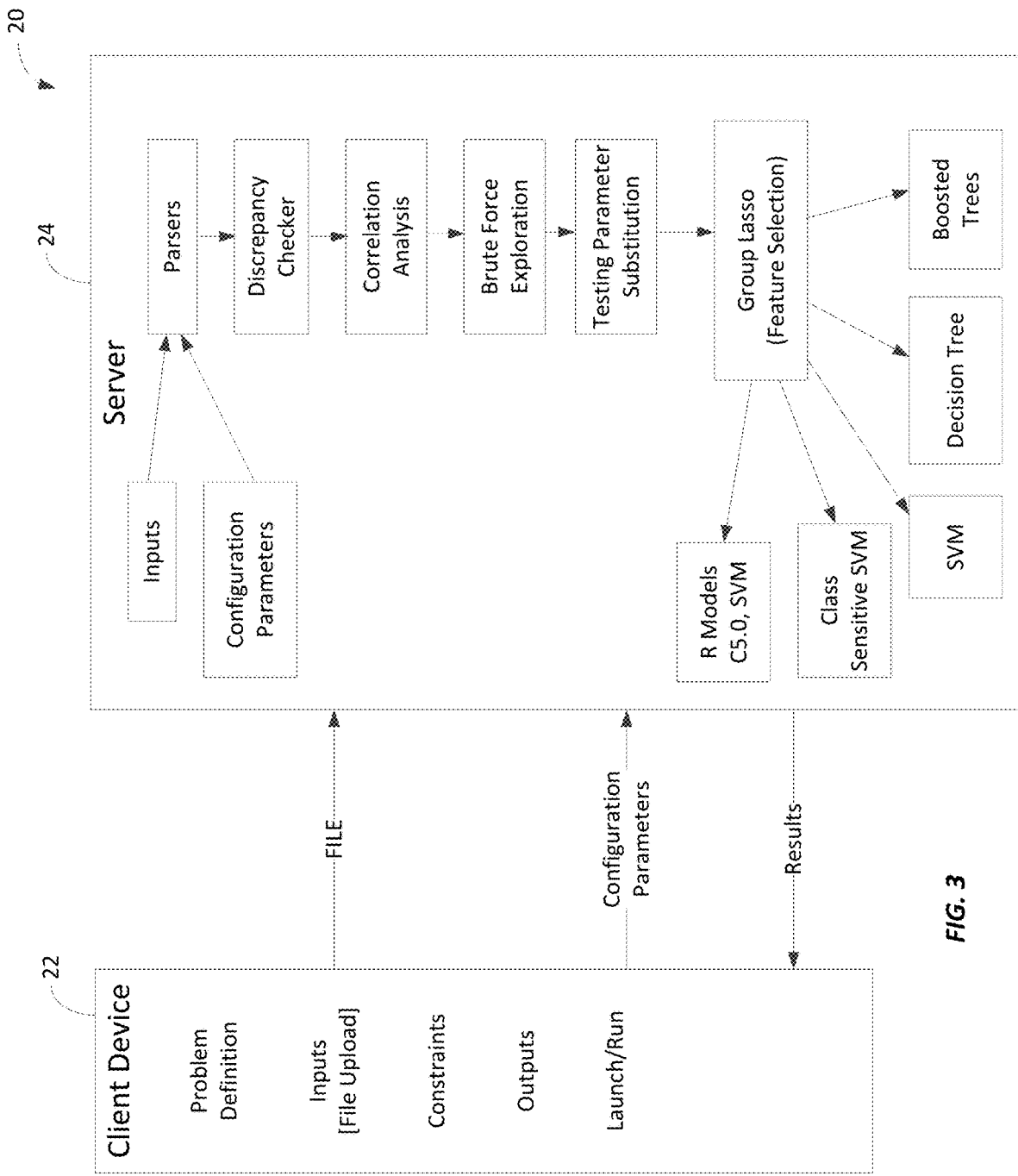
FIG. 3 schematically illustrates communication between components of the system of FIG. 2 accordingly to some embodiments.

The server 24 may identify ways to reduce the manufacturing time associated with an assembly line in response to requests and data received from the client device 22. For example, FIG. 3 illustrates communication between the client device 22 and the server 24 that triggers particular functionality. As illustrated in FIG. 3, a user of the client device 22 may initially define a problem with an assembly line 10 (for example, a process is too slow, a process is prone to errors or shutdowns, a process has a high scrap rate, and the like). The user may use the client device 22 to perform this investigation or this investigation may be conducted separate from the client device 22. For example, in some embodiments, the client device 22 may display one or more user interfaces that guide a user through identifying and defining a problem for an assembly line. Alternatively or in addition, in some embodiments, the client device 22 may display one or more user interfaces that provide a recommendation of one or more tests that may be skipped for a product 14 produced by the assembly line 10 (with or without the user initiating an investigation as described herein).

After identifying the problem, the user of the client device 22 may upload a file to the server 24 that includes inputs. The inputs may include data regarding the assembly line 10, individual stations, measurements, values, tests, and the like as described above. This data may be collected manually, through one or more sensors, or a combination thereof as described above. Accordingly, the user of the client device 22 may create the file of inputs by accessing data stored on the client device 22 or in external devices, such as a IVIES database. In some embodiments, the system 20 (the client device 22 or the server 24) provides one or more users interfaces that guide a user of the client device 22 in creating and uploading a file. For example, FIG. 4 illustrates a user interface 40 for uploading a file. As illustrated in FIG. 4, the user interface 40 provides instructions on how to prepare a file (a dataset), such as in rows representing products and columns representing variables such as serial number, values, measurements, test results, classifications, and the like. In some embodiments, the instructions for uploading a file may vary based on the problem identified for an assembly line (and consequently, the solution or guidance being requested from the server 24).

Figure 6:
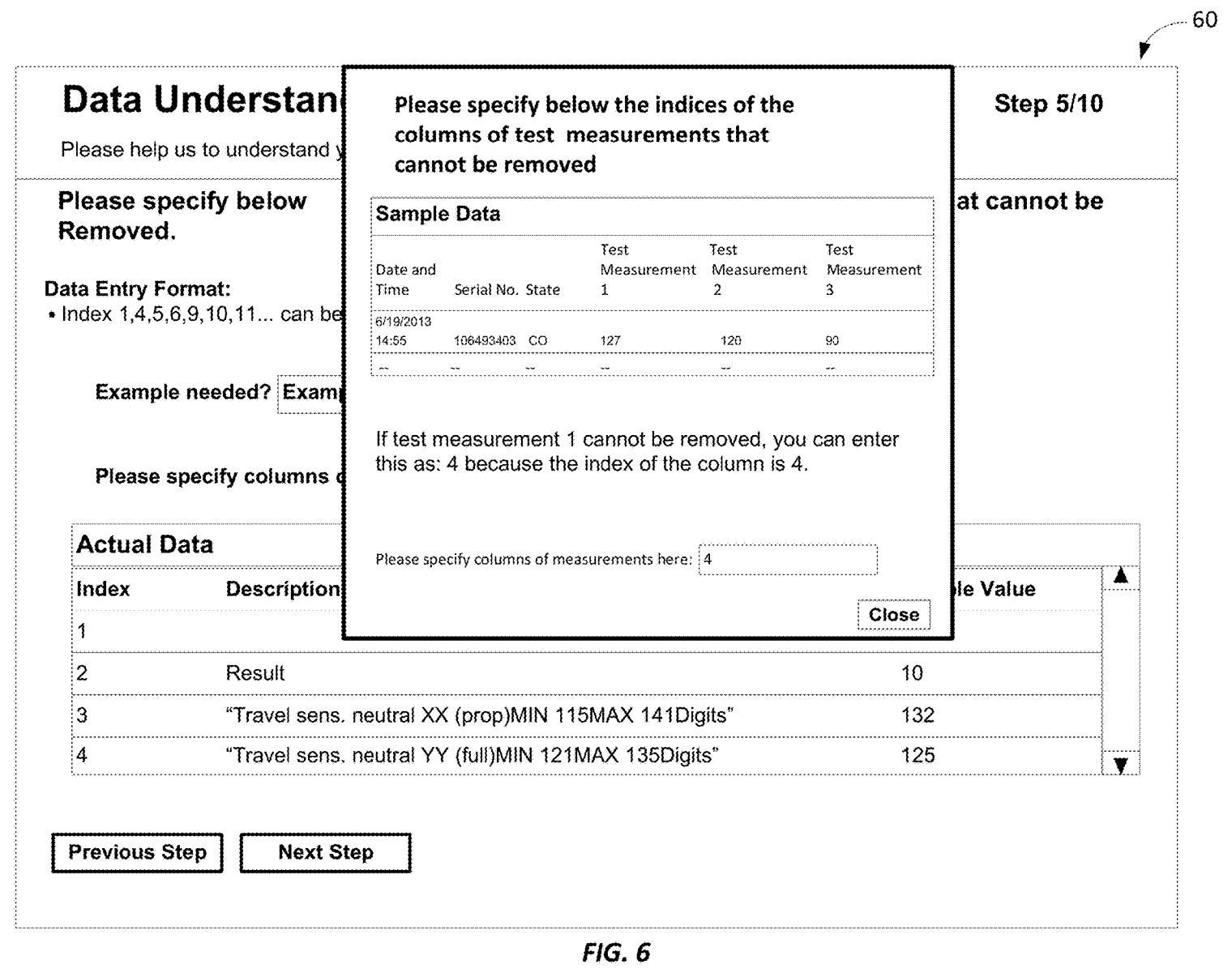

In some embodiments, the client device 22 submits one or more configuration parameters to the server 24 in addition to the file. Again, the system 20 may provide one or more user interfaces that guide a user of the client device 22 in submitting this additional information. For example, FIGS. 5 and 6 illustrate user interfaces 50 and 60, respectively, that request one or more configuration parameters. In some embodiments, the user interfaces 50 and 60 dynamically change based on received input to efficiently receive relevant data from the user.

The configuration parameters may include constraints or desired outputs (for example, particular types or formats of results). For example, through the user interfaces 50 and 60, the server 24 may receive data indicating which uploaded data represent attributes or tests, whether a particular test is a mandatory test required by a customer and, hence, cannot be removed, whether there are tests grouped together such that tests in the group cannot be removed individually, or a combination thereof. Similarly, the configuration parameters may include a time it takes to perform each test. As illustrated in FIG. 7, after initially receiving the configuration parameters, the system 20 may provide a user interface 70 (a confirmation page) where a user may verify the received information before the server 24 analyzes the received data. It should be understood that in some embodiments, rather than or in addition to prompting a user for data (including files, configuration parameters, or both), the server 24 may automatically access needed data from one or more sources, such as a IVIES database associated with an assembly line.

The server 24 receives the inputs (the uploaded file(s)) and the configuration parameters) and analyzes the data to determine a set of results. As illustrated in FIG. 3, analyzing the data may include parsing the data to derive meaning from the data, such as distinguishing numbers and strings of the data, identifying features and measurements to be used for test time reduction, grouping measurements that occur together, identifying an observation that may be predicted by a predictive model, and the like. In some embodiments, the data parsing may be based on configuration parameters, such as the configuration parameters input through the user interfaces 50 and 60 as illustrated in FIGS. 5 and 6.

As further illustrated in FIG. 3, analyzing the data may also include checking the data for discrepancies, performing a correlation analysis, performing feature selection to identify measurements or tests that may be replaced by predictive models, or a combination thereof. Accordingly, the set of results generated by the server 24 may include an identification of a measurement or a test that may be removed, how much time could be saved with such a removal, predictive models that may be used in place of one or more tests, conditions for when such predictive models may be used, and other information. In some embodiments, the server 24 may provide alternative recommendations for modifications to an assembly line to reduce manufacturing time and, optionally, may display the recommendations within an interactive user interface that allows a user to visualize and adjust trade-offs or parameters of one or more recommendations, such as a trade-off between time savings and the number of scraps mistakenly detected as "good" products. For example, manufacturing time may be reduced by eliminating a lengthy but accurate test. However, reducing this test may increase scrap that cuts against the efficiencies gained through a reduction in manufacturing time.

The set of results provided by the server 24 may take various forms depending on the particular data mining methods used, the inputs, and the configuration parameters. In some embodiments, the results provided by the server 24 may include a user interface that displays the results in a visual form (numerically, graphically, or both) to a user of the client device 22. Alternatively or in addition, the results provided by the server 24 may include signals to various systems or devices. For example, the server 24 may transmit signals to stations or other devices associated with an assembly line to automatically initiate one or more changes (for example, turn on or off various test stations, sensors, etc.). In other words, in some embodiments, the server 24 (via the electronic processor 30) automatically modifies one or more operations of the assembly line based on the set of results.

In some embodiments, a user may specify (through the client device 22) what data mining methods the server 24 should use to identify time reductions (e.g., as part of the configuration parameters). Alternatively or in addition, the server 24 may automatically select one or more data mining methods based on the inputs, the configuration parameters, or other data available to the server 24, such as problems with an assembly line, customer requests, and the like. Again, as noted above, the data mining methods performed by the server 24 are described below as separate, stand-alone methods. However, it should be understood that the server 24 may be configured to perform one, all, or a subset of the described methods and may vary what methods are performed based on particular data being analyzed.

As noted above with respect to FIG. 3, the server 24 may parse inputted data. This process may include identifying attributes (measurements or values) or tests that do not contribute to the prediction of whether a product is "good" or "bad." In other words, when a large number of products always have the same attribute (measurement or value), the attribute is not differentiating and, thus, is unnecessary. Similarly, when a test always has the same result (the same value), the test is not differentiating and, thus, is unnecessary.

Figure 8:
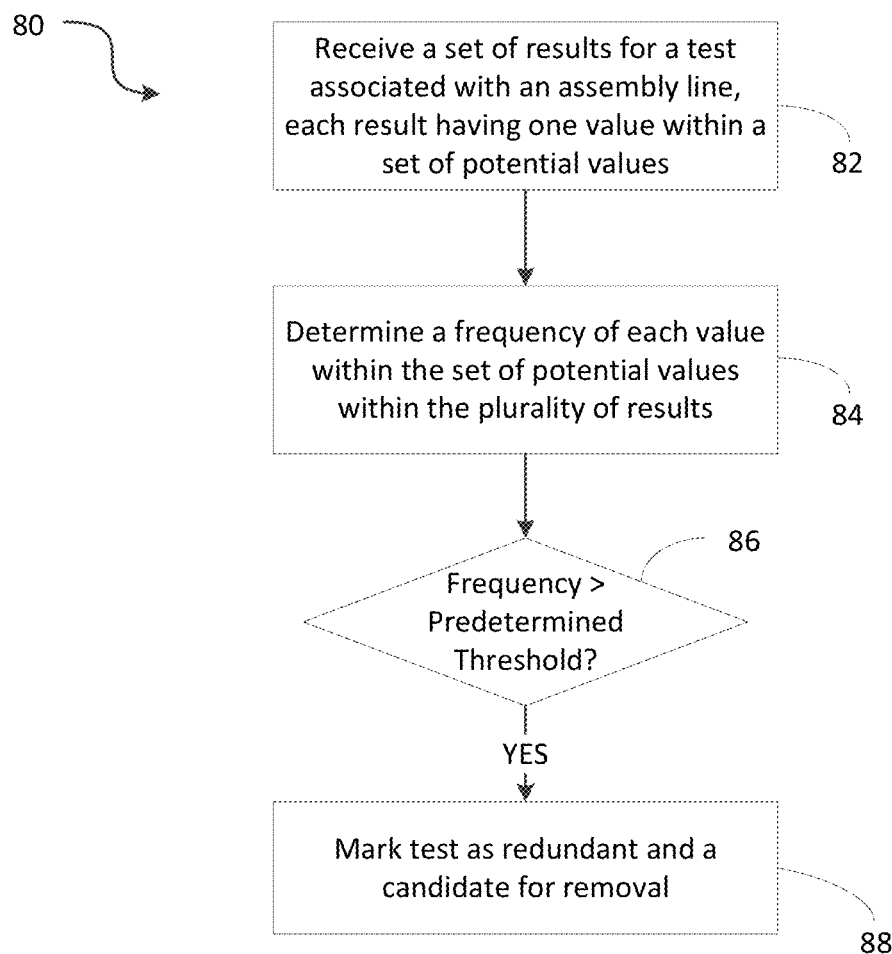
FIG. 8 is a flowchart illustrating a method performed by the system of FIG. 2 for identifying a test that does not contribute to the prediction of whether a product is "good" or "bad" according to some embodiments.

For example, FIG. 8 is a flowchart illustrating a method 80 performed by the server 24 for identifying a test that does not contribute to the prediction of whether a product is "good" or "bad" according to some embodiments. As illustrated in FIG. 8, the method 80 includes receiving a plurality of results of a test performed for a plurality of products produced via the assembly line 10 (at block 82). The server 24 may receive such data from the uploaded file of inputs. Each of the plurality of results has one value within a set of potential values. For example, a test may generate a result either having a value of "good" or having a value of "bad." The server 24 determines a frequency for each value within the set of potential values with the plurality of results (at block 84). When the frequency of any particular value within the set of potential values satisfies a predetermined threshold (for example, is greater than or equal to a predetermined threshold, such as 100%, 99.9%, or the like) (at block 86), the server 24 marks the test for removal because the test always provides the same, non-differentiating result (at block 88). For example, when the result of a test can be n potential categories and the test always outputs the same category, then the test is redundant and can be removed. In particular, when a test can output either "good" or "bad" and the test always outputs "good" (for example, of m samples tested, where m is very large representing an adequate sampling, all or a predetermined percentage of the m samples have the output "good"), then the test could be removed. As another example, when a test that outputs a real number within a certain range of numbers outputs the same number for m samples, that test is redundant. For example, a test that can output a real number between −100 and 100 but consistently returns 0 (for example, of m samples tested, all the m samples have an output of 0 and m is very large), then the test is considered redundant and may be removed. In this method, the results provided by the server 24 may include outputting an identification of one or more tests marked as redundant for display on the client device 22, outputting a list of test identifiers ranked by redundancy, transmitting (for example, automatically) a signal to a device (for example, a test station) associated with tests identified as redundant instructing the test station to stop the test, or a combination thereof. Also, in some embodiments, the server 24 may exclude data associated with removed tests from further processing as described below.

Figure 9:
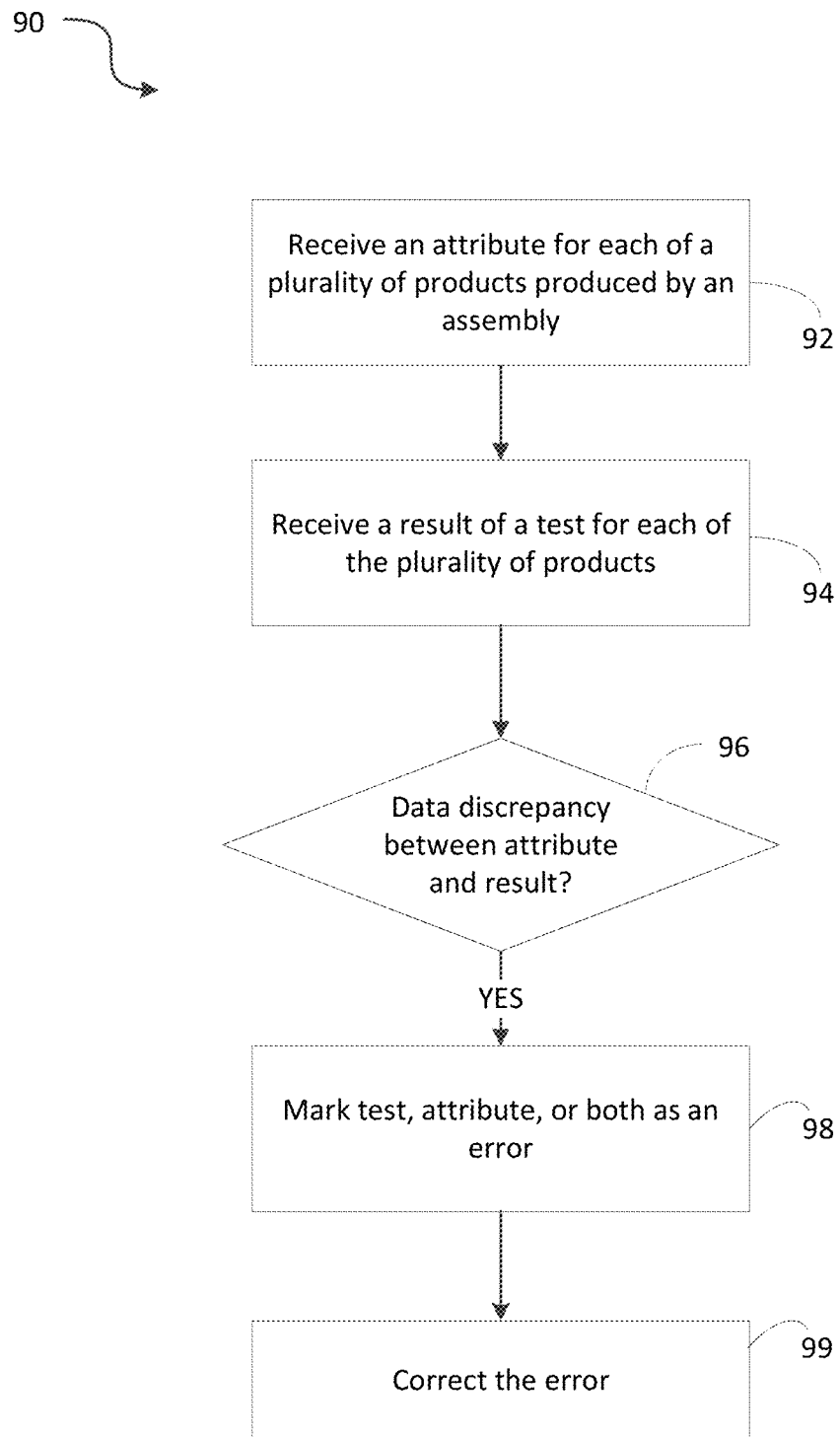
FIG. 9 is a flowchart illustrating a method performed by the system of FIG. 2 to check for data discrepancies according to some embodiments.

As noted above with respect to FIG. 3, the server 24 may also check for discrepancies in inputted data. For example, FIG. 9 is a flowchart illustrating a method 90 performed by the server 24 to check for data discrepancies and, optionally, perform data cleaning and preprocessing based on identified discrepancies. As described in more detail below, detected data discrepancies may indicate a malfunctioning apparatus or system associated with an assembly line.

As illustrated in FIG. 9, the method 90 includes receiving an attribute (a measurement or value) for each of a plurality of products produced by an assembly line (at block 92) and receiving a result for each of the plurality of products produced by the assembly line (at block 94). The result may be a test result or a product classification (for example, "good" or "bad"). The server 24 then determines whether the attribute for each of the plurality of products is consistent with the result for each of the plurality of products (at block 96). When the attribute for each of the plurality of products is not consistent with the result for each of the plurality of products, the server 24 marks the attributes, the results, or both as an error (at block 98). Optionally, the server 24 may also correct the error (at block 99). In some embodiments, to identify a data discrepancy, the server 24 may identify a discrepancy between attributes and test results for a predetermined percentage of products produced by the assembly line.

The server 24 may determine whether the attribute for each of the plurality of products is consistent with the test result for each of the plurality of products in one or more ways. For example, in some embodiments, a histogram analysis of the attributes, the results, or both is performed. In particular, the server 24 may identify data inconsistencies using one or more data mining methods, such as performing a histogram analysis to detect a change in distribution of the attributes, the results, or both. For example, assume that a test provides a result having a real number value. Further assume that in the year 2015, results have a real number value within a normal distribution with a mean at 0 but, thereafter, in the year 2016, the mean of the distribution changes to 0.5. Accordingly, the server 24 may perform a histogram analysis of at least one of the attributes for each of the plurality of products and the result for each of the plurality of products and determine, based on the histogram analysis, whether a change in a mean of a normal distribution satisfies a predetermined threshold (for example, is equal to or exceeds a predetermined threshold). When a change in the mean of a normal distribution satisfies such a threshold, the change may indicate a potential problem in a sensor, a testing station, a database, or the like, such that the device may need to be serviced or recalibrated. Thus, the method 90 may be used to identify malfunctioning measurements, tests, stations, or a combination thereof as a prerequisite to identifying ways to reduce manufacturing time as described below.

As another example, server 24 may identify data inconsistencies based on tolerances and numerical roundings that may cause a product, with attributes within an acceptable tolerance for a test, to be marked as "bad." For example, assume a test classifies a product as "bad" when measurement for the product is greater than or equal to 14.500. When readings for the product (for example, sensor readings) are rounded to two decimal points before being compared to the 14.500 threshold, a product may be classified as "bad" even though the actual readings for the product may be within the acceptable tolerance. For example, a reading of 14.496 is less than the threshold but may be rounded to 14.500 prior to the test. Thus, the server 24 may be configured to compare a format of test parameters (for example, tolerances, minimums, maximums, thresholds, and the like) to a format of attributes applied to the test parameters to determine consistency. When possible, the server 24 may correct such an identified inconsistency, such as by modifying the test results for products that were misclassified due to rounding errors. Again, the server 24 may check for these discrepancies to identify and correct malfunctioning tests before identifying ways to reduce manufacturing time as described below.

Data discrepancies may also result from incomplete or improper storage of data. For example, a product may be classified as "good" or "bad" based on n measurements where each of the n measurements needs to be within a predefined range for the product to be classified as "good." For purposes of example, assume there are two tests that measure temperature and pressure, respectively, and a product 14 is classified as "good" when the temperature is between 45° F. and 60° F. and the pressure is between 10 bar and 20 bar. However, in reality, the range of temperatures at which a product is classified as "good" may change dynamically with each product. When the changed range is not stored in, for example, a dataset or a database, the dynamic change in range may lead to incomplete or missing information. In this situation, incomplete information (how the range of temperatures changes over time or for particular products) might lead to inaccurate classifications. Accordingly, the server 24 may be configured to determine whether a parameter of a test generating the result for each of the plurality of products is static or dynamic, and when the parameter is dynamic, the server 24 may apply the appropriate parameter and update the data accordingly.

Accordingly, the server 24 may identify data discrepancies to identify errors or other malfunctioning measurements, tests, or stations, which the server 24 may alert a user to within the provided results. The server 24 may also use the identified data discrepancies to modify attributes, test results, classifications, or a combination thereof to correct for a data discrepancy before identifying ways to reduce manufacturing time as described below. Also, when data is not available in a form that may aid the server 24 in identifying such discrepancies, the results provided by the server 24 may include an identification of an additional measurement, value, or test to perform and record.

Some examples of data discrepancies that may be detected by the server 24 using the method 90 as are follows:

(1) At a test station, products are classified as "scrap" but the products pass all tests. This discrepancy may result from a software communication problem (that may or may not have been corrected). The server 24 may identify this discrepancy and automatically update the classification of the affected products from "scrap" to "good" as applicable.

(2) At a test station, products are classified as "scrap" but the products pass all tests. This discrepancy may be associated with a failure code. For example, over time (when the time that a test has been performed exceeds a predetermined threshold) test boundaries may need to be adjusted (for example, to account for machine wear and the like), but this change may not have been recorded. The server 24 may identify this discrepancy and automatically update the classification of the affected products from "scrap" to "good" as applicable.

(3) At a test station, products are classified as "good" although the products failed at least one test. This discrepancy may occur because the tests are associated with dynamic boundaries that allow different boundaries to be used for different products but only a static boundary was used for all products. The server 24 may identify this discrepancy and automatically update the classification of the affected products from "good" to "scrap" as applicable.

(4) At a test station, products are classified as "good" although the products failed at least one test. This discrepancy may occur because the test boundaries are misrepresented (incorrect). The server 24 may identify this discrepancy and automatically update the classification of the affected products from "good" to "scrap" as applicable.

(5) At a test station, products fail a test but the products are actually "good." This discrepancy may occur because the test measurement was related to calibration, and, when the calibration was done, the average of two values measured before and after calibration was provided. However, using the last measured value, the product should have been classified as "good." The server 24 may identify this discrepancy and automatically update the measurement to the last measured value (and any affected test results or classifications) as applicable.

(6) At a test station, products are classified as "scrap" but the products passed the relevant tests. This discrepancy may be caused by an error that happened before the products went through the test station. In this situation, the server 24 may remove the data for these products, may update the data if possible, or a combination thereof as applicable.

Accordingly, by comparing attributes and results, the server 24 may identify data discrepancies. In response to identifying a data discrepancy, the server 24 may access other data, such as error logs, configuration parameters, and the like, to identify a cause of the discrepancy and how to handle the discrepancy. In some embodiments, the server 24 may also inform a user through the client device 22 of identified discrepancies and allow the user to provide a reason, a solution, or both for the identified discrepancy.

Returning to FIG. 3, after checking for data discrepancies, the server 24 may perform a correlation analysis. For example, FIG. 10 is a flowchart illustrating a method 100 performed by the server 24 for performing a correlation analysis to remove highly-correlated data, such as measurements, values, tests, or stations.

Figure 10:
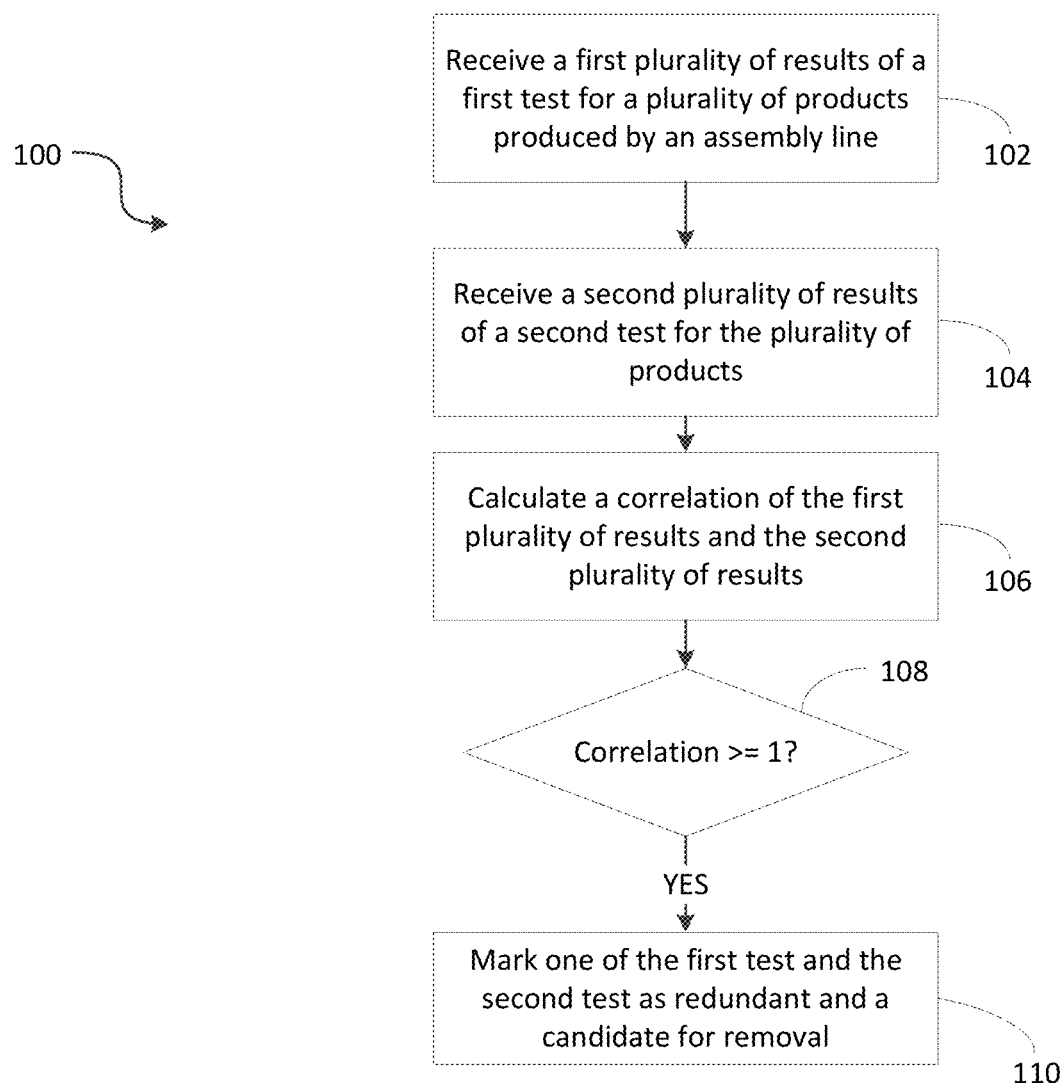
FIG. 10 is a flowchart illustrating a method performed by the system of FIG. 2 to perform a correlation analysis to remove correlated data according to some embodiments.

As illustrated in FIG. 10, the method 100 includes receiving, with the server 24, a first plurality of results of a first test for a plurality of products produced by an assembly line (at block 102). The method 100 also includes receiving, with the server 24, a second plurality of results of a second test for the plurality of products (at block 104). The server 24 calculates a correlation of the first plurality of results and the second plurality of results (at block 106). For example, the server 24 may calculate a Pearson correlation, as represented by the below formula:

$$\rho(X, Y) = \frac{\text{cov}(X, Y)}{\rho(X)\rho(Y)}$$

where cov(X,Y) is the covariance of X and Y and ρ(X) and ρ(Y) are the standard deviation of X and Y, respectively, where X is the first plurality of results of the first test and Y is the second plurality of results of the second test.

The server 24 also determines whether the correlation satisfies a predetermined threshold (for example, is equal to or greater than 1) (at block 108). When the correlation satisfies the predetermined threshold, the server 24 marks at least one of the first test and the second test for removal (at block 110). In particular, when the results of two tests have a correlation of 1, the two tests may be interchangeable such that one test may replace the other test. In some embodiments, the server 24 may perform a similar correlation between attributes to identify whether a particular attribute (for example, a measurement) is exchangeable with another attribute to eliminate the need for one attribute. In some embodiments, the server 24 calculates a correlation for each combination of tests associated with an assembly line. In other embodiments, the server 24 may be configured to focus on particular tests, such as tests associated with the same attributes, tests occurring close in time, tests not mandated by a customer, and the like. It should be understood, that the server 24 may calculate correlations for all pairs of tests (or attributes) or between a subset of tests (or attributes).

Figure 12:
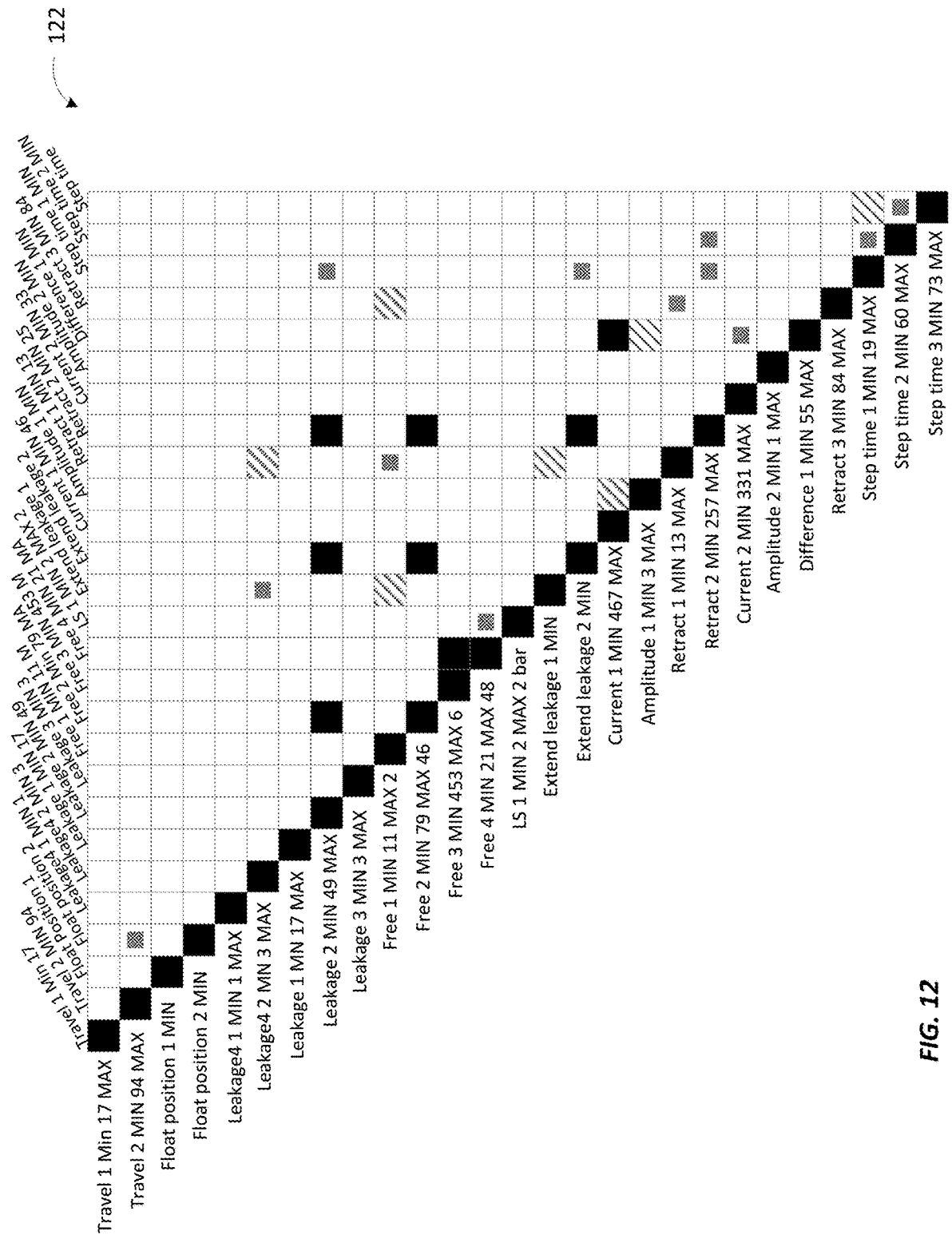

When the server 24 identifies interchangeable tests, the server 24 may remove the test that has the greater average runtime of the two tests to reduce cycle time. However, the server 24 may also take other factors into account, such as a value associated with each test or the removal of each test (for example, one test is customer mandated and, hence, cannot be removed, or one test is less costly to remove than the other test). Also, in some embodiments, the server 24 may identify interchangeable tests and may output identifications of the test and allow a user to choose which test to remove and replace with the other test. Alternatively or in addition, the server 24 may prompt a user for weights to apply when more than one factor is involved in selecting a test for removal. Also, in some embodiments, the server 24 provides the results of this analysis as a table 120 or a chart of correlations 122, such as illustrated in FIGS. 11 and 12, respectively.

Figure 13:
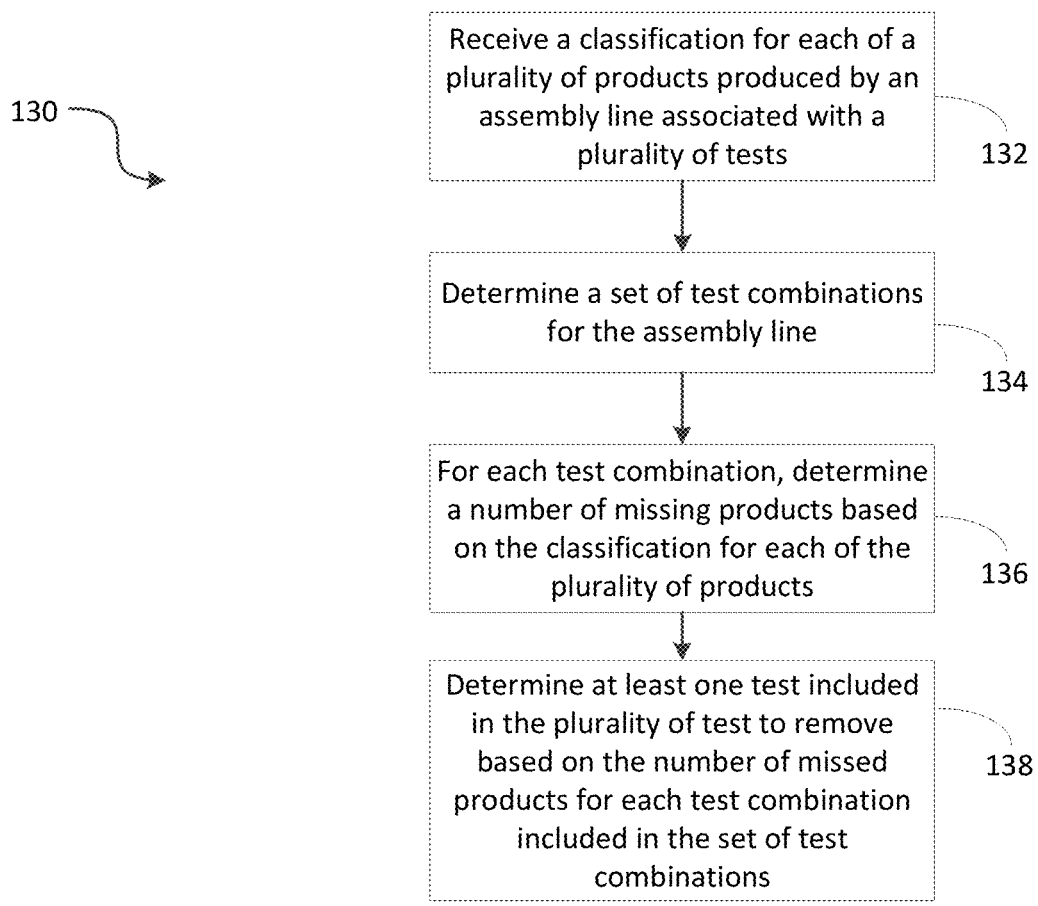
FIG. 13 is a flowchart illustrating a method performed by the system of FIG. 2 to perform a brute force feature exploration to identify a set of tests to remove according to some embodiments.

In some embodiments, the server 24 may also perform brute force feature explorations, exhaustive searches, other data mining methods, or a combination thereof to identify one or more tests to remove. For example, FIG. 13 is a flowchart illustrating a method 130 performed by the server 24 to perform a brute force feature exploration to identify a set of tests to remove from an assembly line. As described in more detail below, the server 24 may perform the method 130 by hypothetically removing one or more measurements, tests, values, or stations and tracking the effect of the removal on product classifications. Thus, the server 24 may use the method 130 to identify combinations of measurements, tests, values, or stations that may be removed to reduce manufacturing time while maintaining product classifications within an acceptable range.

For example, as illustrated in FIG. 13, the method 130 includes receiving, with the server 24, a classification for each of a plurality of products produced by an assembly line (at block 132). As described above, when an attribute of a product satisfies one or more tolerances of a test (for example, is between a minimum threshold and a maximum threshold, is greater than a threshold, is less than a threshold, is equal to a threshold, and the like), the product is classified as "good." Otherwise, the product is classified as "bad" or "scrap." For example, when a test is associated with pressure readings and has tolerances specifying a range between 10 and 20 bar and a particular product has a pressure measurement of 21 bar, then the product is classified as "bad." A product may be identified as "scrap" when the product is identified as "bad" by at least one test. This classification information may be included in the file uploaded to the server 24 as described above.

As illustrated in FIG. 13, the method 130 also includes determining, with the server 24, a set of test combinations for the assembly line (at block 134). In particular, when the assembly line includes a plurality of tests, the set of test combinations includes each combination of one or more of the plurality of tests. In some embodiments, the server 24 uses a data mining algorithm (for example, a decision tree, a logistic regression, and the like) to determine the set of test combinations.

Thereafter, for each test combination included in the set of test combinations, the server 24 determines a number a products produced by the assembly line classified as "scrap" based on the classification for each of the plurality of products (as received by the server 24 as part of the uploaded inputs) and not identified as "scrap" based on the test combination (at block 136). In other words, from the inputted data, the server 24 knows what products were scrapped and what products were not. Accordingly, the server 24 hypothetically removes one or more tests and identifies what products would not be identified as scrap because the products only failed a removed test. Hence, the server 24 may identify, for each test combination, the number of product actually scraped that would be missed using the test combination. As described herein, this number of actual scraped products may be referred to as a number of missing products. Accordingly, in some embodiments, the server 24 determines, for each test combination included in the set of test combinations, the number of missing products based on the classification for each of the plurality of products by hypothetically removing one or more tests included in the plurality of tests based on the test combination, determining a hypothetical product classification for each of the plurality of products with the one or more tests hypothetically removed, and comparing the hypothetical product classifications to the product classifications included in the dataset.

As illustrated in FIG. 13, based on the number of missing products determined for each test combination, the server 24 determines at least one test to remove for the assembly line (at block 138). For example, in some embodiments, the server 24 determines the test combination having the fewest number of missed products and determines one or more tests hypothetically removed from the test combination with the fewest number of missing products. The server 24 may then marked the determined one or more test hypothetically removed for the test combination with the fewest number of missing products as candidates for removal. However, in some embodiments, the server 24 considers other factors before marking a test as a candidate for removal. For example, in some embodiments, the server 24 compares a time savings associated with removing a particular test to the impact the removal of the test has on the accuracy of identifying scraps. In particular, the server 24 may determine a time savings associated with the hypothetically removed test or tests and compare the time savings to the number of missed products associated with the test combination having the fewest number of missed products. For example, the server 24 may determine whether the decrease in accuracy of identifying scrap products associated with removing the test or tests satisfies a predetermined threshold (for example, is equal to or less than a predetermined threshold), whether the decrease in accuracy satisfies a predetermined threshold (for example, is equal to or less than a predetermined threshold) and the time savings satisfies a predetermined threshold (for example, is equal to or greater than a predetermined threshold), or the like. When the server 24 determines that the time savings does not warrant the associated decrease in accuracy, the server 24 may identify the test combination with the next fewest number of missed products and perform a similar process as described above to determine whether to remove the hypothetically removed tests associated with the next test combination. The server 24 may repeat this process until the server 24 identifies one or more tests to remove or identifies that none of the tests can be removed without negatively impacting accuracy to an unacceptable degree. In addition to or as an alternative to considering a balance between time savings and accurate scrap classification, the server 24 may consider other factors when determining one or more tests to remove, such as how close to the tolerance a product is that should have been scrapped but isn't identified as scrapped using a particular combination of tests, how stringent the requirements are for passing a particular test, is a particular test mandated by a customer, research and development or the like, or a combination thereof. In some embodiments, as the server 24 does not use any predictive models to perform this analysis, this solution to identify tests to be removed may be referred to as a "model free" solution.

Figure 14:
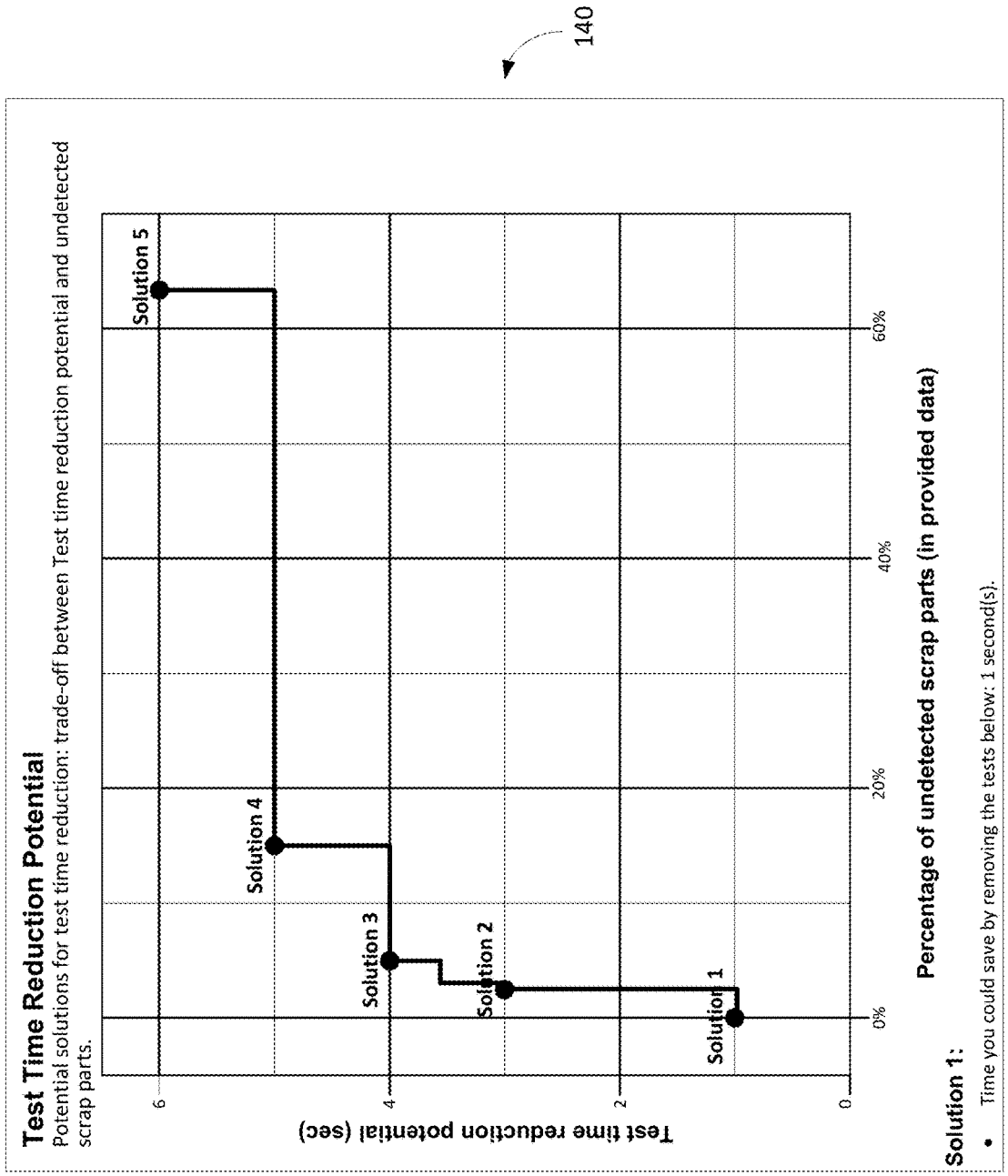
FIG. 14 illustrates a sample table summarizing time savings for removing one or more tests and a corresponding impact on identifying scraps according to some embodiments.

The server 24 may provide the results of this process in various forms. For example, in some embodiments, the server 24 outputs an identifier of at least one test to remove. In other embodiments, the server 24 may output a data structure (for example, a table) summarizing time savings for removing a particular test or a combination of tests and a corresponding impact on accurately identifying scraps (see, for example, the screen shot 140 illustrated in FIG. 14). It should be understood that the above brute force process for identifying tests to remove may also be used to identify attributes (measurements or values) to remove or stations to remove.

Figure 15:
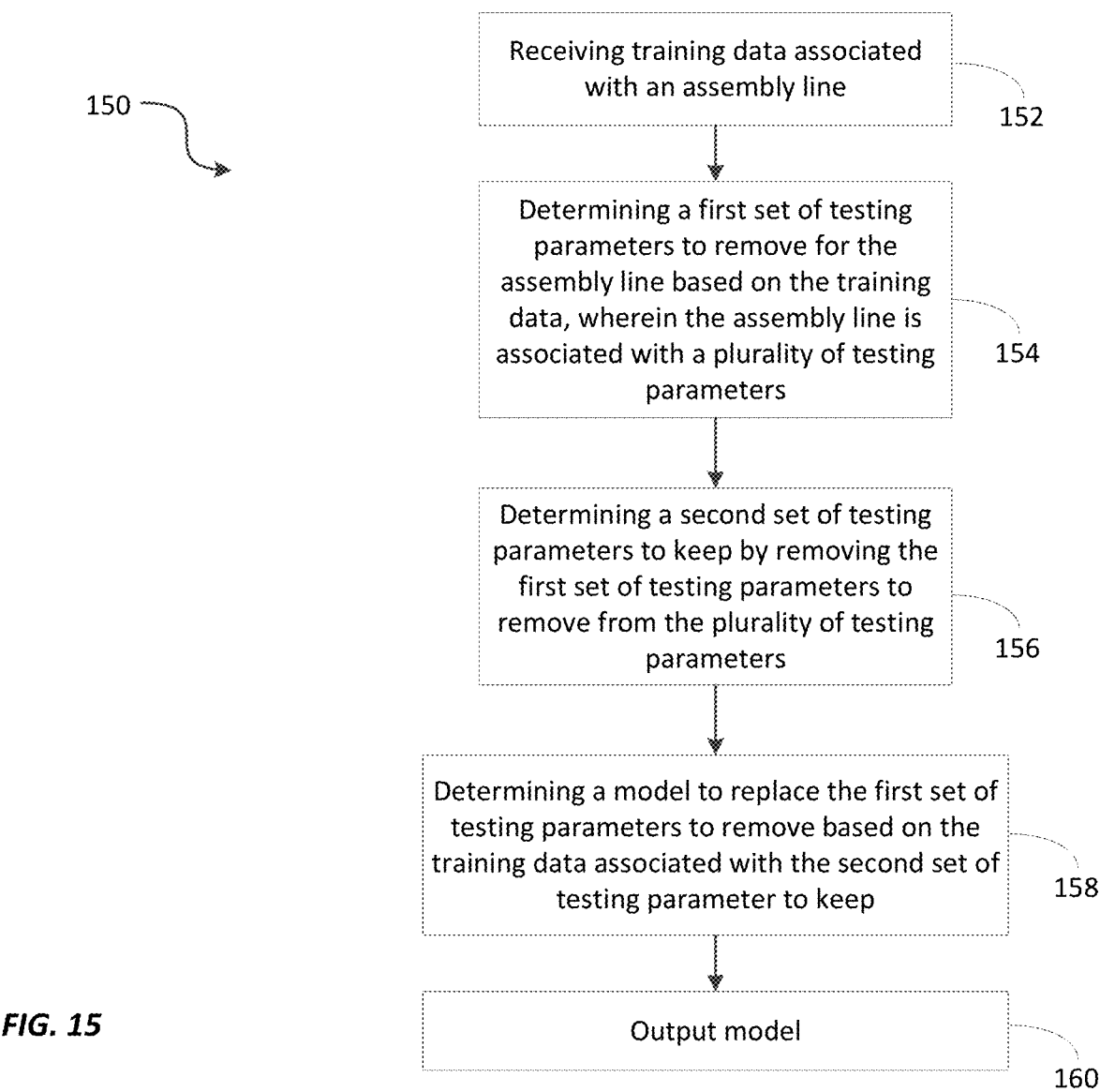
FIG. 15 is a flowchart illustrating a method performed by the system of FIG. 2 to deploy a predictive model to replace one or more testing parameters according to some embodiments.

Returning to FIG. 3, the server 24 may also identify one or more measurements, values, tests, or stations (testing parameters) to substitute with one or more data mining or machine learning models to reduce manufacturing time. For example, FIG. 15 is a flowchart illustrating a method 150 performed by the server 24 to deploy a classification model to predict a "good" or a "bad" product using a subset of values, measurements, tests, or stations (testing parameters) and eliminating other existing values, measurements, tests, or stations. As described in more detail below, the method 150 generally includes receiving training data associated with an assembly line (at block 152). The server 24 may receive the training data within the uploaded file of inputs (actual collected data for an assembly line) and the assembly line may be associated with a plurality of testing parameters. The method 150 also includes determining a first set of testing parameters to remove for the assembly line (candidate testing parameters) (at block 154). In some embodiments, the server 24 may use one or more of the methods described above to identify candidate testing parameters to remove. In addition or alternatively, the server 24 may use a principle component analysis (PCA), a regression model with a sparsity constraint (for example, least absolute shrinkage and selection operator (LASSO)), or the like to identify candidate testing parameters to remove. PCA is a statistical procedure that uses orthogonal transformation to reduce feature dimensionality and identify a set of principle components that explain variance in data. LASSO is a variant of a traditional logistic regression model, which has a L1 loss function. For example, given all tests as input variables and the end-of-line result or classification ("good" or "bad") as the response variable, optimizing LASSO may produce a sparse solution where some testing parameters will have a weight of zero, which can be used to eliminate redundant tests. Accordingly, the server 24 may determine the candidate testing parameters for removal based on the testing parameters with a zero weight in LASSO.

After identifying the first set of testing parameters to remove (at block 154), the server 24 determines a second set of testing parameters to keep for the assembly line by removing the first set of testing parameters from the plurality of testing parameters (at block 156). The method 150 also includes determining a predictive model to replace the first set of testing parameters to remove based on the training data associated with the second set of testing parameters to keep (at block 158). In some embodiments, the server 24 determines the relevant training data for the second set of testing parameters from the received training data and may also split the training data temporally, such as using the first 80% of data as training data for the predictive model and using the last 20% of the data as testing data to validate the generated predictive model.

In some embodiments, the server 24 generates the predictive model using non-linear methods such as, for example, support vector machines, classification and regression tress (CARTs), boosted decision trees, and the like. Support vector machines are a supervised classification method that learns a separating hyperplane in a feature space to best differentiate "good" products from "bad" products. CARTs learn a hierarchical set of rules from inputted data, thus called rules, to maximize classification accuracy. Boosted decision trees is a class of ensemble methods that trains a maximum number of decision trees and employs a weighted voting mechanism between the resulting decision trees to determine a final classification (for example, models with higher accuracy will have a higher weight in the final result). In some embodiments, the server 24 may benchmark combinations of candidate feature subsets and candidate non-linear models to determine a model to replace the removed testing parameters. After generating the predictive model, the server 24 outputs the model (at block 160), such as by outputting the model to a user (for example, as a data file) or automatically updating the testing process for the assembly line to turn off the removed testing parameters and forward remaining testing parameters to the generated model as applicable.

Some challenges encountered in model training include: (1) testing parameters belonging to pre-defined groups that cannot be removed individually (some approaches, such as filter methods or wrapper methods, do not take into account this situation); (2) training datasets having imbalanced class distribution, such as, for example, when a dataset has approximately 11,000 measurements and 54 tests but only 0.9% are scrapped products; and (3) unequal misclassification costs (the cost of misclassifying a "scrap" product as a "good" product is much higher than misclassifying a "good" product as a "scrap" product). For example misclassifying a "scrap" product as "good" may trigger warranty claims for a product. However, misclassifying a "good" product as "scrap" may only result in rework costs or manual overwrites.

These characteristics of the training datasets may introduce particular challenges to classification and feature selection (for example, the selection of tests to replace with predictive models). For example, group LASSO is a known classifier that performs feature selection on a group level. However, some implementations of this method do not incorporate the class imbalance, the difference in misclassification costs, or the group structure in the datasets. Hence, the server 24 may develop a customized cost-sensitive version of group LASSO to generate a predictive model. Generating such a cost-sensitive version of group LASSO may include creating a balanced training dataset. For example, the server 24 may use random over-sampling examples (ROSE), which is a sampling technique that estimates the statistical distribution of the data, oversamples the majority class ("good" products) and down samples the minority class ("scrap" products) to create a balanced training dataset. After creating the balanced training dataset, the server 24 assigns weights to each test based on time costs. For example, the server 24 may use the following equation to set such weights:

$$\min_{\beta} \ell(\beta) + \lambda \sum_{g=1}^{G} w_g \|\beta_g\|, w_g = \sum_{i \in I_g} t_i$$

where $l(\beta)+\lambda\Sigma_{i=1}^{n} \log[1+e^{-y_i(\beta_0+\Sigma_{g=1}^{G} X_{i,g}\beta_g)}]$ is a loss function that is minimized to obtain the weights $\beta_g$, in which, n is the number of data points in the balanced training dataset, $y_i$ is the classification (end-of-line classification of "good" or "scrap") for each data point i, G is the total number of features (for example, the number of intermediate values or measurements tested), $\beta_g$ is the weight for each test, $X_{i,g}$ is a matrix containing all measurements for all training data points, $l(\beta)$ sums up, for all data points, the errors whenever the logistic-function prediction does not agree with the classification, $w_g$ are weights on $\beta_g$ that takes into account how time consuming each test is, and $\lambda$ is a penalty parameter.

Figure 16:
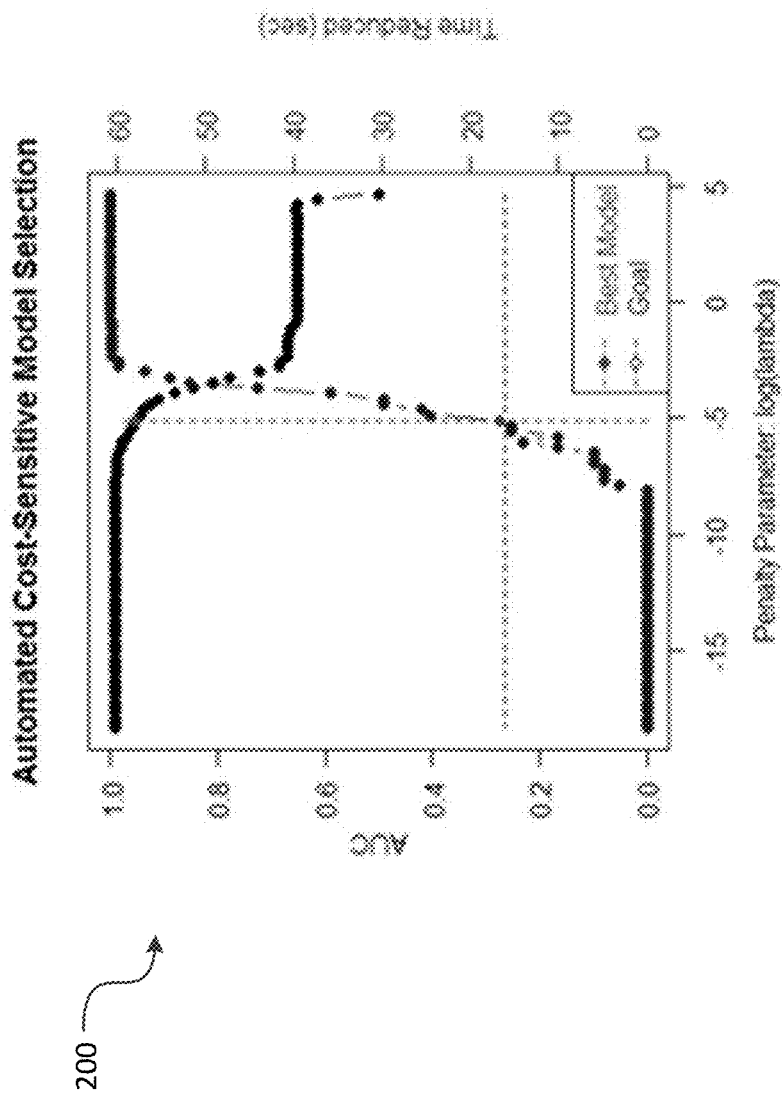
FIGS. 16 and 17 are graphs illustrating a method of tuning a predictive model.

The server 24 then performs adaptive model selection based on the area under the curve (AUC) and adjustments to the decision threshold. For example, adjusting the penalty parameter λ changes the sparsity in the weights. In other words, the larger the penalty parameter λ is, the more weights $\beta_g$ that are driven to zero. Tests with zero weights do not contribute to a final "good" or "scrap" result. Thus, a larger penalty parameter λ also results in a greater test time reduction. Keeping all tests will result in the best AUC possible, and removing all test steps is equivalent to random guessing (for example, when the AUC is set to 0.5). Therefore, as illustrated in the graphical 200 of FIG. 16, the server 24 may identify the best penalty parameter λ that removes a sufficient amount of testing time while limiting the sacrifice on model performance (AUC).

Figure 17:
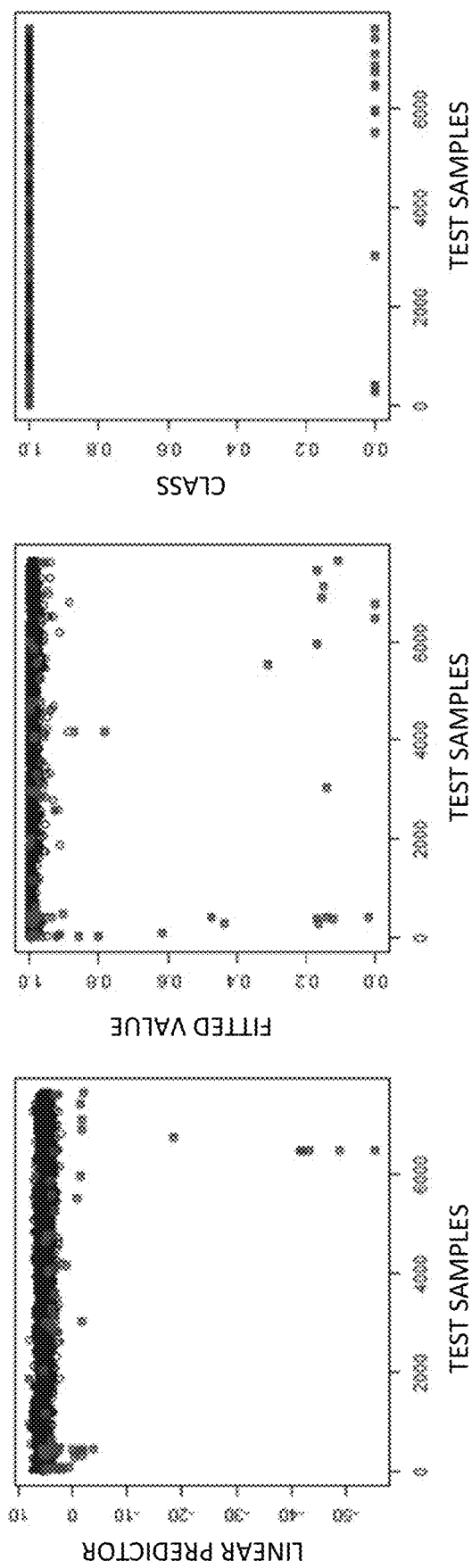

As illustrated in FIG. 17, the outcomes of the resulting logistic function may be probabilities between 0 and 1 of whether a product will be "good" or "scrap." Using a threshold between 0 and 1 allows a "good" classification when the probability is larger than the threshold and a "scrap" classification otherwise. This threshold may be tuned using a training dataset and may be tested on the training dataset. After obtaining a balanced training set, the model may be trained and the penalty parameter λ may be adjusted to determine how the balanced training dataset affects the weights $\beta_g$ and the resulting AUC.

Thereafter, the server 24 may implement one or more ensemble machine learning methods, such as boosting, metacost, or a combination thereof, to reduce bias in supervised learning. For example, when group LASSO produces bias feature reduction, such ensemble machine learning methods train weak group LASSO classifiers on random subsets of a training dataset and vote on these models to derive a final redundant feature.

One drawback of group LASSO is that group LASSO is essentially a linear model and, hence, does not capture potential non-linear relations among tests. Hence, while using group LASSO to guide feature (test) selection, the server 24 may train non-linear models on the remaining features (for example, using a support vector machine with a radial basis function and two implementations of decision trees (for example, CART and C5.0)). For example, in some embodiments, the non-linear models are trained on 80% of the data and tested on the remaining 20% of the data. When a new part comes in, the new product is tested using the remaining tests, and these test measurements are provided as input to the non-linear model to predict whether the product is a "good" product or a "bad" product.

The server 24 may also employ an automatic hyper-parameter tuning procedure when training one or more non-linear models, which determines optimal hyper-parameters to enhance performance of the models. In one embodiment, the server 24 may perform the automatic hyper-parameter tuning procedure using a R package called "caret." This package provides an interface for 169 data mining models in multiple (e.g., 21) packages, and allows the server 24 to specify "tunelength" and "tuneGrid" hyper-parameter variables for different models. For example, the model "support vector machine with RBF kernel" has two hyper-parameters "sigma" and "C." Accordingly, setting "tunelength" to 3 allows the package to determine 3 values for "sigma" and 3 values for "C," which results in a total of 9 combinations (3 multiplied by 3) of hyper-parameter values to train the models. When the server 24 selects a final performance metric to be the AUC, the server 24 may use the parameter combination that gives the highest AUC as the final model.

It should be understood that, in some embodiments, in addition to or as an alternative to generating a model to predict an end-of-line product classification, the server 24 may be configured to generate one or more models to replace intermediate testing parameters using data mining methods. For example, the server 24 may substitute a test, a measurement, a value, or a station with a predictive model (an estimator) based on one or more of the remaining measurements, values, tests, or stations. The predictive model may make the prediction using linear regression, non-linear regression, or a combination thereof. For example, in some embodiments, the server 24 uses the same data mining methods as described above (for example, decision trees, support vector machines, logistic regression models, and the like) but generates a model that predicts the results of an intermediate test as compared to an end-of-the-line result. For example, when a test can be predicted (e.g., perfectly) based on other tests, the test may be removed. Similarly, in some embodiments, the server 24 uses association rule mining to predict testing parameters or combinations. Association rule mining predicts an attribute and generally includes performing discretization, rule mining (R rules, with a defined minimum support and confidence value), and storing and pruning.

Also, in some embodiments, the server 24 may substitute one or more testing parameters with one or more models as described above conditionally when one or more predetermined conditions are satisfied. For example, when a proposed data mining or machine learning model (that eliminates certain testing parameters) predicts end-of-line results for a particular product (for example, based on values, measurements, or the like obtained for such a product) with high confidence, then a product may not pass through the "eliminated" test. However, when the confidence in the prediction is low, then the product may pass through the "eliminated" test. Accordingly, in these embodiments, a test may not be actually eliminated but may be selectively used based on the confidence of the predictive model substituting the test.

Thus, embodiments described herein provide systems and methods for reducing manufacturing time, such as the testing time associated with an assembly line, using data mining methods. One or more results may be provided to client requests that recommend ways to reduce manufacturing time, such as identifying redundant tests or modeling performance. The system may be structured as a web server that handles client requests and communicates with an analytics server that, based on inputted data, generates statistics and predictions, performs data analysis, applies logic modules, and performs data extraction and preprocessing, such as performing description analysis, predictive modeling, visualization, large scale data analysis, and historical data analysis. As noted above, the sub-solutions described herein may be used in various combinations or individually.

Various features and advantages of the invention are set forth in the following claims.

What is claimed is:

1. A system of identifying a time reduction in a manufacturing time associated with a plurality of products produced via an assembly line, the system comprising:
an electronic processor configured to
receive training data associated with a plurality of tests for the assembly line, the training data including measurements and test data associated with the plurality of tests as applied to one or more products produced via the assembly line,
determine a first set of tests from the plurality of tests to remove for the assembly line based on the training data,
determine a second set of tests to keep by removing the first set of tests from the plurality of tests,
generate a predictive model using a supervised machine learning classification method to replace the first set of tests, the predictive model trained based on the training data associated with the second set of tests, and
automatically update a testing process for the assembly line to turn off the first set of tests and use the predictive model in place of the first set of tests.

2. The system of claim 1, wherein the electronic processor is configured to determine the first set of tests to remove for the assembly line using at least one selected from a group consisting of a principle component analysis and a regression model with a sparsity constraint.

3. The system of claim 1, wherein the electronic processor is configured to generate the predictive model using at least one selected from a group consisting of a support vector machine, a classification and regression tree, and a boosted decision tree.

4. The system of claim 1, wherein the electronic processor is configured to generate the predictive model by benchmarking combinations of candidate feature subsets and candidate non-linear models.

5. The system of claim 1, wherein the electronic processor is configured to generate the predictive model by developing a customized cost-sensitive version of group least absolute shrinkage and selection operator (LASSO).

6. The system of claim 1, wherein the electronic processor is configured to generate an additional predictive model to replace a third set of tests, wherein the third set of tests is a set of intermediate tests associated with the assembly line.

7. The system of claim 6, wherein the additional predictive model predicts a result of an intermediate test of the assembly line and wherein the predictive model predicts a result of an end-of-the-line test of the assembly line.

8. The system of claim 1, wherein the electronic processor is configured to substitute the first set of tests with the predictive model when a predetermined condition is satisfied.

9. The system of claim 8, wherein the electronic processor is configured to substitute the first set of tests with the predictive model based on a confidence of the predictive model.

10. A method of identifying a time reduction in manufacturing time of a plurality of products associated with an assembly line, the method comprising:
receiving, with an electronic processor, training data associated with a plurality of tests for the assembly line, the training data including measurements and test data associated with the plurality of tests as applied to one or more products produced via the assembly line;
determining, with the electronic processor, a first set of tests from the plurality of tests to remove for the assembly line based on the training data,
determining, with the electronic processor, a second set of tests from the plurality of tests to keep by removing the first set of tests from the plurality of tests,
generating, with the electronic processor, a predictive model using a supervised machine learning classification method to replace the first set of tests, the predictive model trained based on the training data associated with the second set of tests, and
automatically updating a testing process for the assembly line to turn off the first set of tests and use the predictive model in place of the first set of tests.

11. The method of claim 10, further comprising:
generating an additional predictive model to replace a third set of tests, wherein the third set of tests is a set of intermediate tests associated with the assembly line.

12. The method of claim 11, wherein generating the additional predictive model includes generating an additional predictive model predicting a result of an intermediate test of the assembly line and wherein the predictive model predicts a result of an end-of-the-line test of the assembly line.

13. The method of claim 10, further comprising:
substituting the first set of tests with the predictive model when a predetermined condition is satisfied.

14. The method of claim 13, wherein substituting the first set of tests with the predictive model when the predetermined condition is satisfied includes substituting the first set of tests with the predictive model based on a confidence of the predictive model.

15. The method of claim 10, wherein determining the first set of tests to remove for the assembly line includes determining the first set of tests to remove for the assembly line using at least one selected from a group consisting of a principle component analysis and a regression model with a sparsity constraint.

16. A non-transitory computer readable medium including instructions that, when executed by an electronic processor, causes the electronic processor to execute a set of functions, the set of functions comprising:
receiving training data associated with a plurality of tests for an assembly line, the training data including measurements and test data associated with the plurality of tests as applied to one or more products produced via the assembly line;
determining a first set of tests from the plurality of tests to remove for the assembly line based on the training data;
determining a second set of tests from the plurality of tests to keep by removing the first set of tests from the plurality of tests;
generating a predictive model using a supervised machine learning classification method to replace the first set of tests, the predictive model trained based on the training data associated with the second set of tests; and
automatically updating a testing process for the assembly line to turn off the first set of tests and use the predictive model in place of the first set of tests.

17. The computer readable medium of claim 16, wherein the set of functions further comprises:
generating an additional predictive model to replace a third set of tests using data mining, wherein the third set of tests is a set of intermediate tests associated with the assembly line.

18. The computer readable medium of claim 17, wherein generating the additional predictive model includes generating an additional predictive model predicting a result of an intermediate test of the assembly line and wherein the predictive model predicts a result of an end-of-the-line test of the assembly line.

19. The computer readable medium of claim 16, wherein the set of functions further comprises:
substituting the first set of tests with the predictive model when a predetermined condition is satisfied.

20. The computer readable medium of claim 19, wherein substituting the first set of tests with the predictive model includes substituting the first set of tests with the predictive model based on a confidence of the predictive model.

* * * * *